INVENTORS
NIKOLAI NIKOLAEVICH LEVIN
GRIGORY ISAEVICH STURMAN, DECEASED
By SOFYA LEONIDOVNA STURMAN,
ADMINISTRATRIX

United States Patent Office 3,473,059
Patented Oct. 14, 1969

3,473,059
ROTARY STEPPING MOTOR WITH SALIENT HALF-POLES AND PLURAL CONTROL WINDINGS
Nikolai Nikolaevich Levin, Karla Marxa St. 125, Apt. 30, Riga, U.S.S.R., and Grigory Isaevich Sturman, deceased, late of Riga, U.S.S.R., by Sofya Leonidovna Sturman, adminstratrix, Romonosova St. 8, Apt. 19, Riga, U.S.S.R.
Continuation-in-part of application Ser. No. 366,801, May 12, 1964. This application Oct. 17, 1967, Ser. No. 675,994
Int. Cl. H02k 37/00
U.S. Cl. 310—49  3 Claims

ABSTRACT OF THE DISCLOSURE

A rotary stepping motor provided with salient half-poles and plural control windings in which the rotor and stator are toothed and assembled of laminated steel sheets, with small teeth being provided on the surface of each stator half-pole, and the small teeth have a pitch equal to the pitch of the rotor teeth.

A field winding together with the control windings are disposed in the stator slots and supplied with direct current and the winding is employed for additional excitation of the half-poles thus reducing the required value of the current pulse supplied from the commutator.

The commutator is connected to the control windings through a single resistor and the field winding to a direct current circuit through the same resistor.

This application is a continuation-in-part of the application Ser. No. 366,801 filed May 12, 1964, now abandoned.

The present invention relates to the field of automatic control systems and systems for controlling the flight of various flying apparatus, and more particularly, to a discrete-action electric power drive used in such systems.

The employment of a discrete-action electric power drive, and specifically, of a step electric motor, opens up the possibility of creating workable open- and closed-circuit digital control systems which are more simple than the closed systems with continuous-action actuating motors.

As regards their design, the known step electric motors fall into two principal classes:

(1) Reactive motors, in which the rotor is free of field windings or permanent magnets and the stator carries only control windings supplied with D.C. pulses;

(2) Motors with active rotors carrying either permanent magnets or field windings.

The principal advantage of active-rotor step motors is the low power commutated by the control device, since the permanent magnets, or the field winding, produce initial magnetic field intensity in the air gap and the control windings are only required to develop a slight magnetizing force to change the pattern of field distribution in order to obtain the desired torque.

However, a rotor designed with windings requires slip-rings and brushes to be provided to supply the windings. On the other hand, the presence of permanent magnets or windings on the rotor, makes it difficult to reduce the polar pitch of the rotor, i.e. a motor of this type cannot be furnished with a large number of steps per one rotor revolution. At the same time, the efficiency of excitation sharply drops with the decrease of the polar pitch. For example, an increase in the number of pole pairs two-fold reduces the efficiency of excitation four-fold.

For the above reasons, motors with rotors having no windings or permanent magnets are being widely used in digital control systems. The number of pole pairs provided on such motors is determined by the number of rotor teeth, which in turn is limited by engineering considerations only (the width of the teeth, for example, cannot be made smaller than 1 mm.). As we have noted above, the disadvantages of such motors are a considerable control power required from the commutator and, as a result, considerable overall dimensions and weight of the device. In addition, owing to the absence of an excitation circuit, reactive step motors have insufficient capabilities in damping automatic oscillations arising in operation. Attempts made to overcome these deficiencies of the reactive step motors have failed to produce the desired effect (see, for instance, U.S. Patent No. 3,148,319, cl. 318–166).

The object of the present invention is, therefore, to create a step motor with a rotor having no windings or permanent magnets but capable of building up an initial magnetic field in the air gap so as to reduce the control power requirements and, hence, to decrease the dimensions and weight of the commutating devices.

Other objects and advantages of the present invention will be understood from the following description.

Expressed briefly, the idea of the present invention consists in that to provide for an initial magnetic field in the air gap, field winding coils are deposited together with the control windings in the stator slots. The field winding is connected to a D.C. circuit, thus creating initial intensity in the magnetic field. Having no windings or magnets on its rotor, such a motor possesses the features of a reactive step motor as regards the size of one step, whereas the provision for a field winding, if on the stator alone, gives the present motor the advantages of an active-rotor motor.

FIGURE 1 is a structural diagram of the motor having two control windings.

FIGURE 2 shows an embodiment with four control windings, which may be supplied with single-polar current pulses from a commutator.

FIGURE 3 shows a method of connecting step motor windings so as to achieve rotor fixation with no current flowing in the control windings.

The present invention, however, is wider in scope than the specific embodiments described herein for illustrating the invention presented in the claims.

Figure 1:
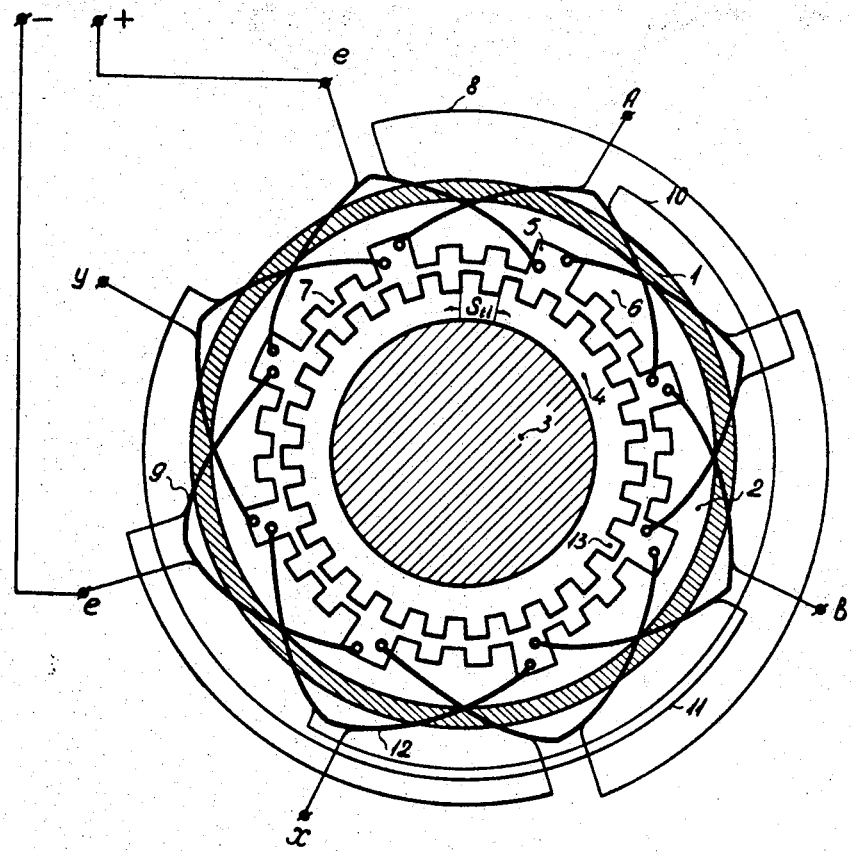
FIGURES 1, 2 and 3 illustrate embodiments of the structural diagram of the present step motor and the method of their connection.
Figure 2:
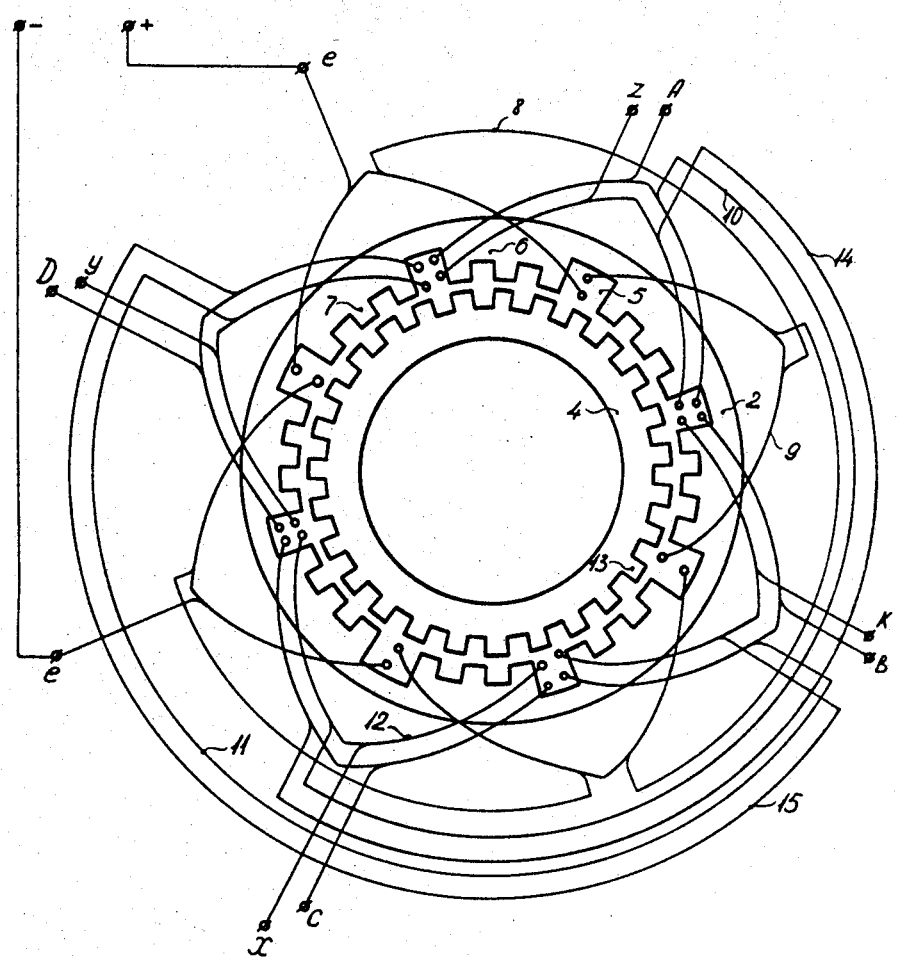

FIGURE 1 shows a step electric motor designed in accordance with the present invention. Like any common reactive step motor, the present motor comprises a cylindrical housing 1 having a press-fitted stator 2, the slots of which accommodate windings A–X, B–Y and e—e. Shaft 3 passing inside the stator carries a toothed rotor 4 and is capable of freely rotating in the bearings installed in the side covers of the housing. The bearings and side covers are not shown in FIGURE 1, as being common in design. FIGURES 1 and 2 show a schematic end-face view of the motor, longitudinal section having no particular features.

Stator 2 is assembled of laminated engineering steel sheets and is provided on the inside cylindrical surface with longitudinal slots 5 defining half-poles 6.

The outside surface of each half-pole is provided with teeth 7 having a constant pitch. The stator slots accommodate the field winding e—e (8) which contains plural coils 9, each enveloping two half-poles without overlapping each other. The field winding coils are connected in series to a common circuit so that each two neighboring coils are connected oppositely.

The motor has at least two control windings (A–X and B–Y) 10 and 11 which are placed in the stator slots accommodating no field windings and each winding comprises an even number of coils. Coils 12 are connected so that two neighboring coils are related to different control windings and each comprises two half-poles without overlapping each other, each two next coils of a single control winding being connected oppositely.

Like the stator, the motor rotor 4 is made of laminated engineering steel plates and is coaxially mounted on shaft 3 inside the stator. On the outside the rotor is furnished with evenly spaced teeth 13. The tooth pitch is $S_{tt}$, the tooth step of the stator half-poles.

The stator half-poles are disposed so that the step between the neighboring teeth of different half-poles embraced by the control winding coils is different from the whole number of rotor tooth step by ½, i.e.

$$S_a = S_{tt}(K_1 \pm \tfrac{1}{2})$$

and the step between the neighboring teeth of different half-poles embraced by field winding coils differs by ¼, i.e. $S_e = S_{tt}(K_2 \pm \tfrac{1}{4})$, where $S_{tt}$ is the rotor tooth step; $K_1$ and $K_2$ are whole numbers chosen to provide convenience for deposition of coils in the slots and to leave sufficient room in the slots. The most reasonable values for these coefficients are $K_1 = K_2 = 1$.

The numbers ($\pm \tfrac{1}{2}$ and $\pm \tfrac{1}{4}$) are required for the selection of the tooth step of the adjacent half-poles on the stator for maintaining the largest range of possible changes in the magnetic flux embracing each coil of the control windings (number $\pm \tfrac{1}{2}$) and for precluding electromagnetic relations between the windings A–X and B–Y (number $-\tfrac{1}{4}$).

In order to counterbalance the radial electromagnetic forces and to obtain a whole number of rotor teeth, the number of coils in one winding is chosen to be even. The number of coils in one control winding gives a unidimensional value for the number of stator half-poles, field winding coils and the number of rotor teeth ($t_1$):

$$t_1 = (n_A + n_B)(K_1 \pm \tfrac{1}{2}) + n_e(K_2 \pm \tfrac{1}{4}) \\ - (n_A + n_B + n_e)(a-1)$$

where:

$n_A$—number of coils in control winding A;
$n_B$—number of coils in control winding B;
$n_e$—number of coils in field winding $e$;
$a$—number of teeth on one stator.

Since $n_A = n_B$ and $n_e = n_A + n_B = 2n_A$, the number of half-poles equal $n_A + n_B + n_e$, the formula for the number of stator poles becomes obvious. Also obvious is the fact that 2 is the minimum number of coils in the control winding.

The most suitable value of $a$, ensuring the highest torque developed per unit of motor weight is 3, though in some instance (such as small-diameter rotor) $a$ can be 2 or even 1.

In most cases the above parameters are selected so as to obtain the number of rotor teeth approximating or equal the number assuring the preset value of one step.

For instance, for:

$a=3, nA=4; K1=K2=1; ti=54;$
$a=3, nA=2; K1=K2=1; ti=27;$
$a=2, nA=2; K1=K2=1; ti=19;$
$a=1, nA=2; K1=K2=1; ti=11;$
$a=1, nA=4; K1=K2=1; ti=22;$
$a=2, nA=4; K1=K2=1; ti=38,$ i.e. the number of teeth on a stator half-pole and the number of coils in the control winding are arbitrary parameters which are to be changed when the number of rotor teeth has reached a preset value. After the number of rotor teeth has been selected, it is necessary to determine the minimum possible diameter of the rotor on consideration that the width of a rotor tooth should not be less than 1 mm. The length of the motor is then calculated on the basis of the required maximum torque.

The structure shown in FIGURE 1 corresponds to the variant with $ti=27$ and is the most suitable as regards the torque developed per unit weight. Since this structure comprises two control windings only, the commutator must produce current pulses of opposite polarity. This is not always desirable, since the commutator becomes more complicated, heavy and less reliable.

FIGURE 2 illustrates a step motor which is distinct from the above-described in the number of control windings, which is four (A, B, C, D). The number of windings has been increased in this case owing to the fact that twice the number of coils is deposited in the slots of the control windings. The coils of the windings are connected by the above-described pattern, the coils of winding C embracing the same half-poles as the winding A, and the winding D embracing the same half-poles as the winding B, the pulses flowing in windings C and D in the opposite direction to the windings A and B.

The operating principle of the proposed motor is as follows. As D.C. voltage is supplied to the field windings, its coils induce magnetizing forces of definite and constant value. These forces excite the stator half-poles, the rotor remaining motionless.

If voltage is supplied to winding A, the magnetizing forces induced by its coils will coincide with the magnetizing forces of the field winding under the first and sixth half-poles, while under the second and fifth half-poles (half-poles are counted clockwise from the topmost half-pole) they have opposite direction. The rotor will tend, therefore, to assume such a position in which its teeth could coincide with the teeth of those half-poles where the magnetizing forces coincide, the teeth being out of alignment where these forces act in opposite directions (this position is shown in FIGURES 1 and 2). If now voltage is supplied to winding B (winding A is disconnected), the magnetizing forces will coincide under the fourth and seventh half-poles. The rotor will turn through one-fourth of the tooth pitch so that its teeth could coincide with the teeth of the half-poles.

If winding A is cut in again and placed under a different polarity (or winding C is supplied with voltage of the same polarity) and winding B is cut off, the rotor will turn in the clockwise direction through another quarter of the tooth pitch until its teeth align with the teeth of the second and fifth half-poles. Voltage of opposite polarity being subsequently supplied to winding B, or winding D is supplied with voltage of the same polarity, the rotor makes a turn through another quarter of the tooth pitch, etc.

If the second pulse put winding B under voltage of polarity opposite to the previous one, the rotor would start moving anti-clockwise. Thus, pulses supplied in a definite succession cause the rotor to rotate in step-like fashion in either direction with a step equal $90°/ti$.

Figure 3:
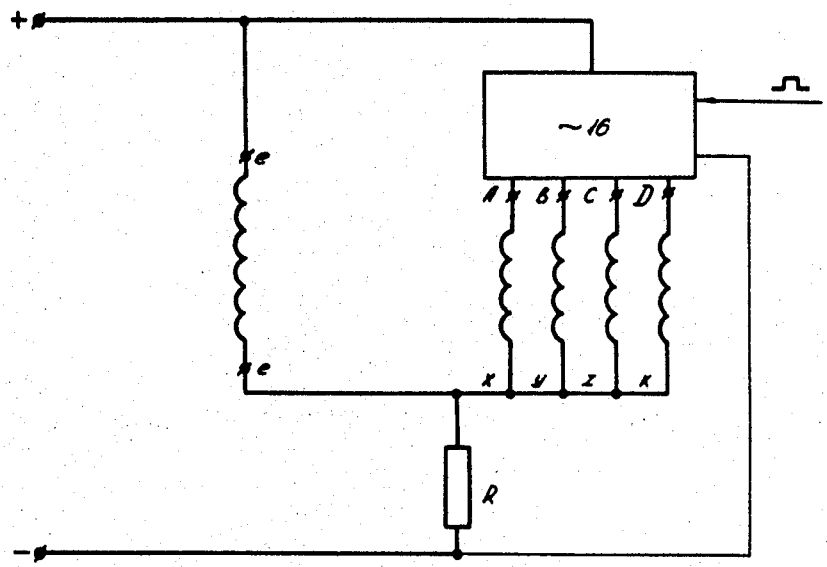

FIGURE 3 shows the connection of the present step motor to the mains. The control windings are supplied from the mains through commutator 16, whose operation is controlled by current pulses. This method of motor connection is characteristic in that the field winding, as well as control windings, is energized through the same series active resistor R. As the control windings are cut in, voltage drops across this resistor, since it passes not only field current but control currents as well.

As commutation of the windings stops, i.e. they are cut off after the arrival of the last pulse to the commutator, the voltage drop across resistor R decreases, increasing across the field winding.

If it is possible, by decomposing the magnetic conductivity of each stator half-pole into Fourier series, to achieve in each function of the rotor turning angle the fourth harmonic equal to 2 percent of the first harmonic, the field current increased, for example, twofold, produces an electromagnetic fixing torque equal to 30–40 percent of the maximum synchronizing torque corresponding to the connected control windings.

In motor operation, the fixing torque reduces in proportion to the square of reduction of field current, so that this torque (7–10 percent) does not exert practically any braking or other adverse effect. This ensures simple fixation of the motor rotor in the extreme position owing to automatic rise in field current after disconnection of the control windings.

The following formula can be applied to measure the size of the additional resistance R to correspond the *n*-fold change in the field current and the given ratio of the field circuit resistance to the resistance of the control windings:

$$R = \frac{re}{\dfrac{re}{ra}\dfrac{1}{n-1} - 1}$$

the most suitable value for *n* being 2.

The fourth harmonic can be obtained in the conductivity of the stator half-poles by the selection of the width of the rotor and stator teeth equal to ⅜ of the rotor tooth step.

Compared to the reactive motor, the present step motor has the following advantages:

(1) Small control power taken from the commutator and, therefore, the possibility of utilizing a small-size commutator;

(2) Better damping of automatic oscillations in operation owing to the field circuit functioning as an electromagnetic damper;

(3) A higher efficiency owing to the possibility of electromagnetic energy being transmitted from the control circuits to the field circuit and back;

(4) A higher frequency pickup owing to a reduction in the control power, since low-power control windings have smaller inertia;

(5) Simple fixation of the rotor in the extreme position owing to the field winding, the current in which can automatically be increased with discontinuation of information;

(6) The possibility of the commutator being unloaded with a motionless rotor, since the control windings are not supplied when the rotor is motionless.

The scope of the present invention, however, is limited by the following claims.

What we claim is:

1. A step electric motor comprising: a laminated stator with longitudinal slots furnished on the inner cylindrical surface thereof, salient half-poles with longitudinal teeth provided through a constant pitch on the outside surface of each half-pole; a field winding deposited in the slots of said stator and having a plurality of coils, each encompassing two half-poles of said stator without overlapping each other and forming a series connection in a common circuit so that two adjacent coils are connected oppositely; at least two control windings deposited in the slots of said stator free of the field winding and each having an even number of coils connected in such a manner that two adjacent coils are related to different control windings, said coils encompassing two half-poles each without overlapping each other and two successive coils of the same control winding being connected oppositely; a laminated rotor mounted coaxially inside said stator and provided with longitudinal teeth arranged uniformly on the outside surface thereof through a pitch equal to the tooth pitch of said stator half-poles, the stator half-poles being disposed so that the pitch of the adjacent teeth of the different half-poles encompassed by the control windings differs by ½ from the whole number of the rotor tooth steps and of the half-poles encompassed by the field winding coils by ¼.

2. A step electric motor according to claim 1, in which the number of control windings is increased two-fold, the coils of the additional windings encompassing the same half-poles of said stator as the coils of the main windings and being connected in series as described in claim 1 but passing current flowing from the head to the end of the winding in the opposite direction than in the main windings.

3. A step electric motor according to claim 1, further comprising a commutator connected to said control windings, and a single resistor connected between one side of said field and control windings and a direct current source, said resistor having a value selected to obtain the required multiplicity of changes in the field current when the control windings are disconnected.

References Cited

UNITED STATES PATENTS

| | | | |
|---|---|---|---|
| 2,249,029 | 7/1941 | Mullerheim | 310—49 X |
| 2,627,040 | 1/1953 | Hansen | 310—49 |
| 3,375,421 | 3/1968 | Venard | 310—49 X |

FOREIGN PATENTS

| | | |
|---|---|---|
| 855,468 | 11/1960 | Great Britain. |

WARREN E. RAY, Primary Examiner

U.S. Cl. X.R.

318—138